Figure 1:
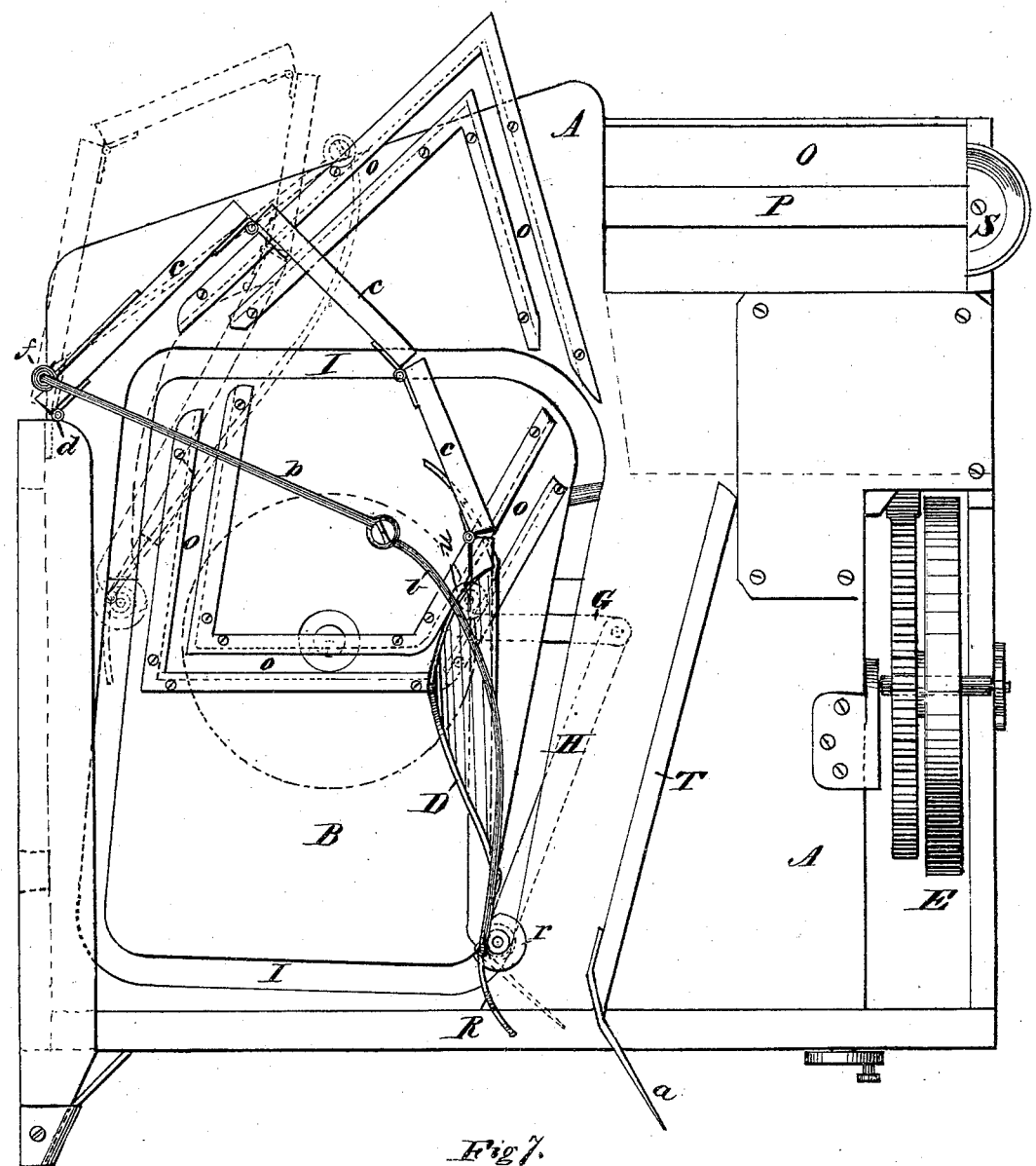

3 Sheets--Sheet 2.
S. D. CARPENTER.
Harvesters.
No. 144,189. Patented Nov. 4, 1873.
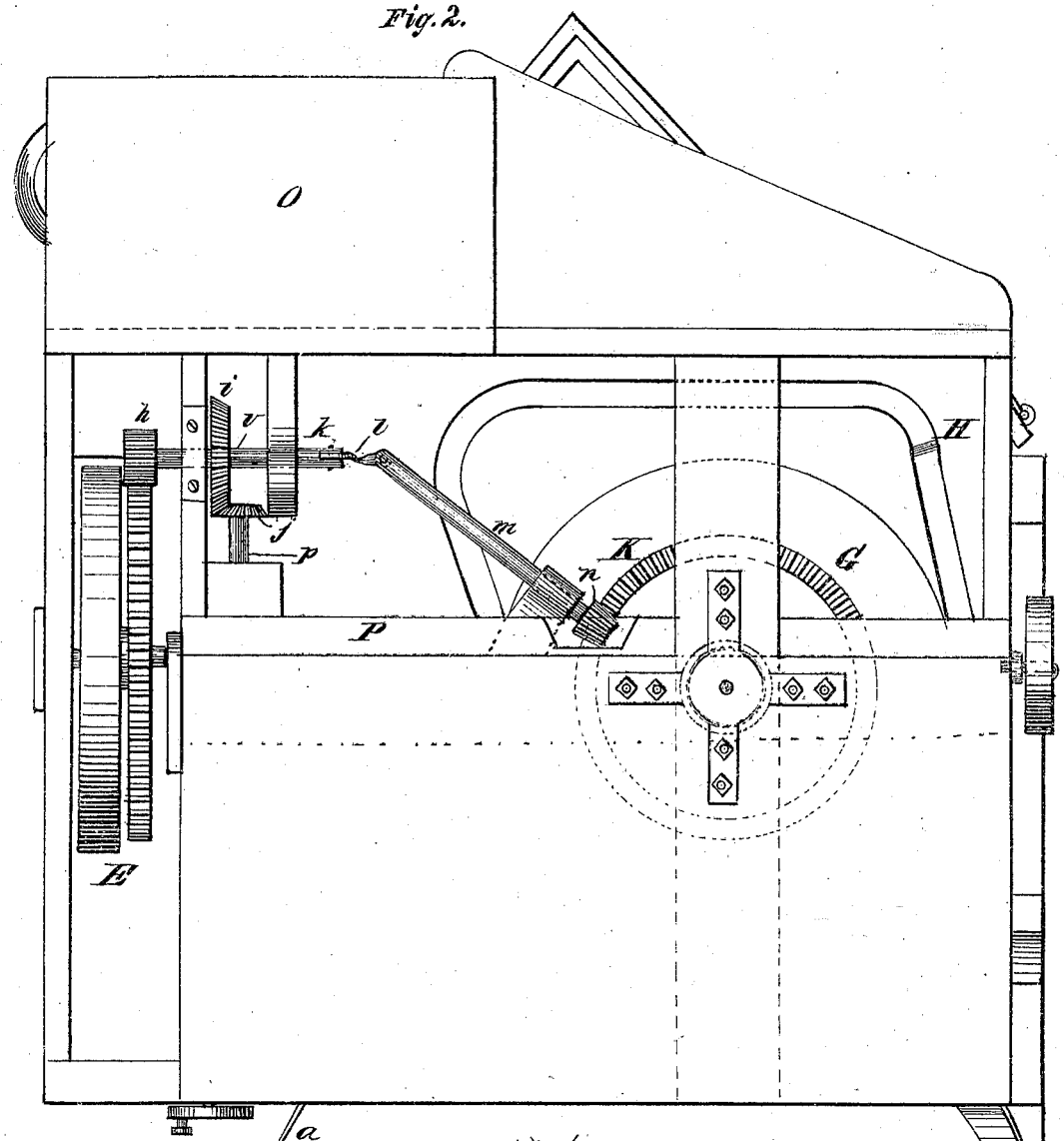
Fig. 2.
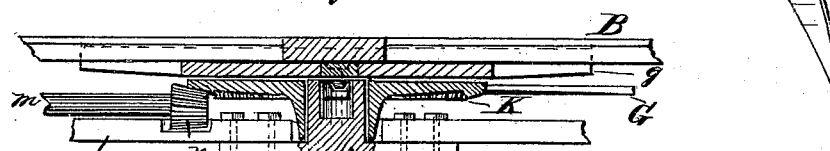
Fig. 4.
Fig. 9.
Witnesses:
W. E. Chaffee
Jacob L. Zuest
Inventor:
S. D. Carpenter
by Dodgeson
Attorneys.
AM. PHOTO-LITHOGRAPHIC CO. N.Y. (OSBORNE'S PROCESS)

3 Sheets--Sheet 3.
S. D. CARPENTER.
Harvesters.
No. 144,189. Patented Nov. 4, 1873.
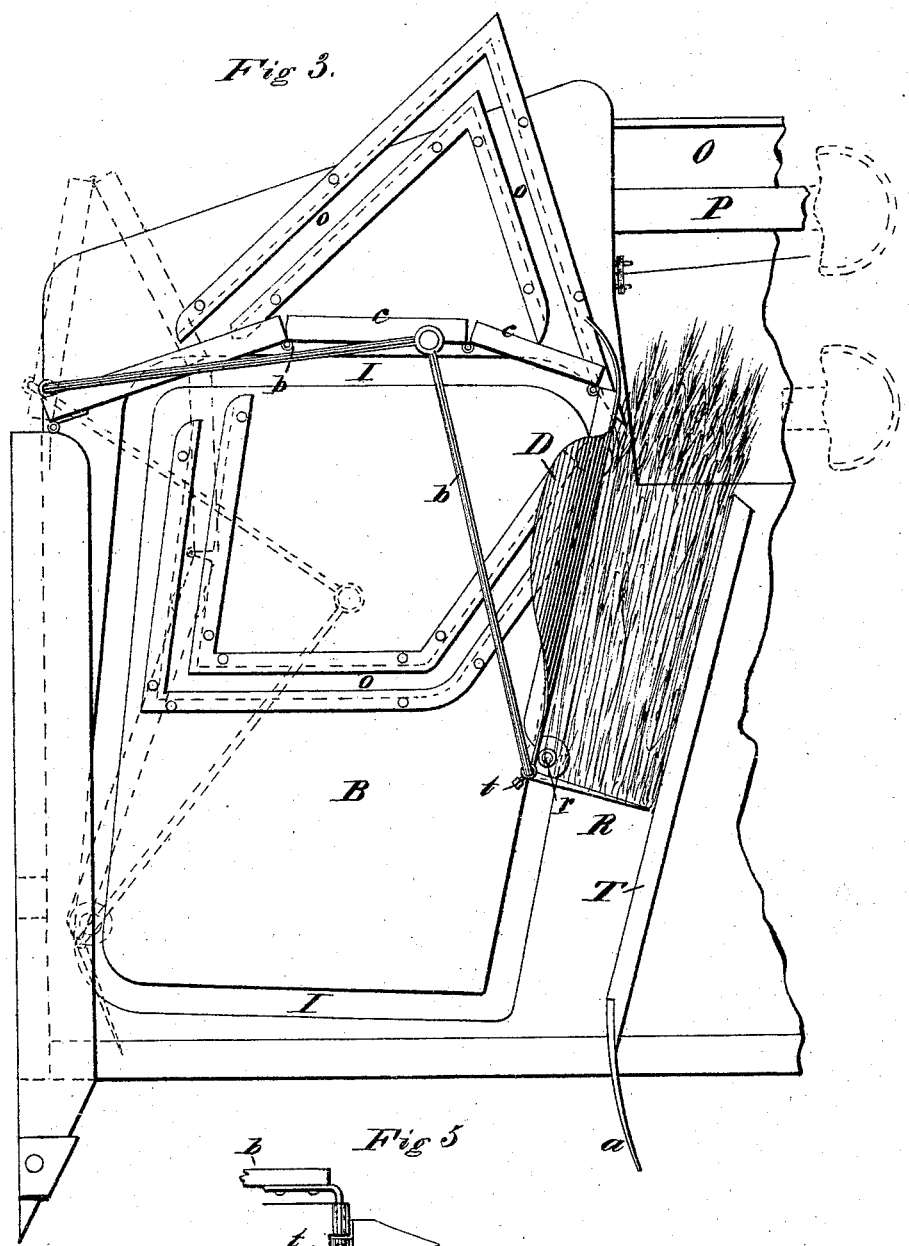
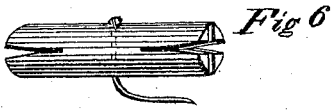

UNITED STATES PATENT OFFICE.

STEPHEN D. CARPENTER, OF MADISON, WISCONSIN.

IMPROVEMENT IN HARVESTERS.

Specification forming part of Letters Patent No. 144,189, dated November 4, 1873; application filed September 5, 1873.

*To all whom it may concern:*

Be it known that I, STEPHEN D. CARPENTER, of Madison, in the county of Dane and State of Wisconsin, have invented certain Improvements in Harvesters, of which the following is a specification:

My invention relates to harvesters; and it consists in a novel construction and means of operating the rake. It also consists in a method of supporting the central portion of the platform, and in the arrangement of a binder's seat and box in relation to the rake, all as hereinafter more fully described.

Figures 1 and 3 are top plan views of the machine embodying my improvements. Fig. 2 is a bottom plan view. Figs. 4, 5, 6, 7, 8, and 9 are detail views.

My improvements have reference to that class of harvesters in which the rake is carried around upon the face of the platform in a horizontal plane, and is operated by mechanism attached to the platform; and the object is to so construct and operate the rake that it shall be presented to the grain on the platform in a manner that will enable it to gather the grain from the extreme corners thereof without tending to shove the cut grain onto the sickle, and at the same time compact the bundle and present it to the binder on the machine in the best possible condition for binding.

I construct the main frame A in any suitable manner, and mount it upon wheels at its extreme edges, one of which, E, is the drive-wheel. I make a central platform, B, which is separated from the rest of the platform by a channel or slot, I, which surrounds it, as shown in Figs. 1 and 3. This central platform is supported at its center only by the means shown in Fig. 4, in which P represents a bar extending from side to side of the main frame; and J is an iron hub bolted thereto, or to that and another bar placed at right angles to bar P by arms, the hub forming the journal for the wheel K, which operates the rake. Upon the upper end of this hub J I secure the platform by means of another hub, having four arms, *g*, projecting radially therefrom, this upper hub fitting within the hub J, which is cast hollow for that purpose, the two hubs where they come in contact being provided with one or more notches and corresponding projections, so that when a bolt is inserted through a hole at their center the two parts are locked rigidly together. The arms *g* of this spider are T-shaped in cross-section, as shown in Fig. 7; and the wooden arms *n* are secured thereto by inserting the arms *g* in slots cut in the center of the wooden arms, as shown in Figs. 7 and 8, the platform B being secured upon the wooden arms. In this way I support the platform securely by a single central support, and at the same time provide a bearing at the center or point of support for the rake-wheel K, which, as shown in Fig. 2, lies horizontal under the platform B; and by thus supporting the platform I leave all around it an open and entirely unobstructed channel, I, as previously stated, through and in which travels the wrist that moves the rake, there being connected to the wheel K and projecting laterally therefrom a rigid arm, G, as shown in dotted lines in Fig. 1, and to the outer end of which arm there is pivoted a rod, H, which carries at its opposite end a wrist that projects vertically up through the slot I, and is attached firmly to the rake D above, there being on this wrist a flanged friction roller or wheel, *r*, that runs in the slot, to prevent friction and assist in turning the corners or angles in the slot.

The gearing is all shown in Fig. 2, and consists simply of a gear-wheel attached to the drive-wheel E, and a shaft, *v*, carrying a pinion, *h*, and a bevel-gear, *i*, gearing into another bevel-wheel, *j*, on the rear end of a shaft, *p*, running at right angles to the front of the frame, where it is provided with a wrist for driving the sickle. To the inner end of the shaft *v*, by a universal coupling, is connected another shaft, *m*, which extends to near the center of the platform, and has a pinion, *n*, arranged to gear into the rake-wheel K, all these parts, except the drive-wheel, being arranged underneath the platform. The rake D, which is arranged on its edge above the platform, consists of a body equal in length to that of the grain or thereabout, with its rear end slightly curved backward, and its upper edge also curved over, as shown in Figs. 1 and 3; and to its front end is hinged a piece, R, which is formed into fingers or teeth, as shown in Fig. 5, this finger-piece R being hinged to the front end of the rake by a vertical rod, which is bent at right angles above the rake, and is connected rigidly to one arm, $b$, of a jointed rod, consisting of two parts of nearly equal length, the opposite end of said jointed rod being hinged to the rear side of another joint-rod, $c$, which latter is hinged at one end to the side of the frame next to the standing grain, while its opposite end is hinged to the rear end of the rake, as shown in Figs. 1 and 3. The finger-piece R is secured upon its joint-rod by set-screws $t$, or any similar means, by which it can be adjusted to stand at any desired angle; and when thus adjusted it is secured firmly thereon, so that it is controlled in its movements by the joint-rod $b$, as hereinafter explained. The joint-rod $c$, connected to the rear end of the rake, is composed of several pieces hinged together, as represented, to enable it to fold up and swing over to the inner side of the platform, as shown in dotted lines in Figs. 1 and 3, when the rake is in operation. In constructing this joint-rod, care must be taken to so form the joints that the rod cannot be brought into a straight line—it standing a little bent or bowing at each joint—so that it will always double or fold in the direction indicated, as it would otherwise become rigid or locked at some of its points, and prevent the parts from operating with ease and certainty. Upon the platform is also arranged a cam-groove, O, which serves to guide the rear end of the rake in its movements, there being attached to the lower edge of the rake, near its rear end, a flanged roller, $u$, which travels in this groove O, the groove being under cut for the flange of the roller, by which means it is prevented from getting out of the groove. This groove O, as will be seen, is set considerably farther back on the platform than the slot I, and is of a different form, the two together acting in connection with the jointed rods $b$ and $c$, to guide the rake in its movements. As the track of the groove O crosses the slot I the flanged roller $u$, Fig. 9, is made of such a diameter as to prevent it from dropping into the slot, and thus enabling it to pass over the slot without difficulty. The slot I, at the front, runs nearly parallel with the cutter-bar, its corner farthest from the grain side being, if anything, a little forward, so as to carry the finger-piece well forward, and insure its sweeping entirely across the platform, and having a good hold in rear of the butts of the cut grain, as the rake begins to move back, and to aid in this I make this outer corner of the slot I very nearly a right-angle, as shown in Fig. 3, though it will work very well when the corner is rounded more, as shown in Fig. 1, my method of driving the rake by the long rigid arm G and the rod H underneath enabling me to carry it around abrupt turns or corners of this kind without difficulty. On the outer side of the platform I arrange a vertical compressing-board, T, and along that side the slot I is arranged parallel or nearly so to this board, as shown in Fig. 3. On the side next to the grain this slot is arranged with its front portion inclined toward the edge of the frame for the purpose of carrying the front end of the rake well over to that side, and insure its passing entirely behind the cut grain as it moves toward the front, as indicated by dotted lines in Fig. 3; and to cause the rake to assume a position as nearly parallel as possible with that side of the platform, so as to prevent it from shoving the grain off at the front, that portion of the groove O on that side is made parallel or nearly so with the slot.

It will be seen that the joint-rod $b$ which guides and controls the movements of the finger-piece R is located above the joint-rod $c$, so as to swing over it, and thus leave each free to perform its movements without interference from the other.

At the rear outer corner of the machine I locate a box, O, upon the outer edge of which I locate one or more seats, S, for the binder to sit upon, with his feet in the box, the latter serving also to catch the litter and shelled grain. From the seat a narrow board, P, extends across the box, to serve as a support for the bundle while being bound, this binding-board being depressed sufficiently below the level of the platform with its front upper edge beveled or rounded off, so as to permit the the sheaf to be slid over it without difficulty.

The intention is, ordinarily, to bind with straw; but sometimes the straw is too brittle or rotten to answer well for this purpose, and, in such cases, I propose to use a tie, composed of a piece of twine, having secured to one end a small stick, having V-shaped slits cut at right angles in each end, as shown in Fig. 6, the tie being secured by passing the free end of the twine through two or more of the slits. When this tie is used the stick is secured in hooks or brackets at the side of the box opposite the binders, with the twine laid loosely across the box, as represented in Fig. 3, so that the sheaf will be shoved directly over it, and thus be in a position for binding.

The manner in which the machine operates is as follows: Supposing the rake D to be in the position shown by the dotted lines in Fig. 1, it is carried forward, beyond, or outside of the grain on the platform until it arrives at the extreme inner front corner, when it is moved straight across, parallel with the cutter-bar, gathering up and sweeping the grain along with it, over against the front part of the compresser-board T, the finger-piece R being turned by the joint-rod $b$ as it approaches the side, thus swinging around behind the butts of the grain, and having a good firm hold behind it, when the rake begins to move back, carrying the grain along with it, and, as it recedes, the finger-piece is turned still more until it stands at a right angle behind the sheaf, as represented in Fig. 3. At the same time the heel of the rake, being guided by the inclined portion of the groove $o$, is forced rapidly outward until it stands parallel with the compresser-board T, thereby compressing the grain into a compact uniform bundle, as represented in Fig. 3, in which condition it is moved straight back onto the binding-board P in front of the binder, who, having a band already prepared, binds it instantly and drops it upon the ground. As the rake passes back its rear end travels along the rear inclined portion of the groove $o$ until its front end arrives at the rear transverse portion of slot I, when its front end is carried across to the opposite side, when it again moves forward, the rear end passing along the opposite inclined portion of the groove $o$ and rapidly arranging the rake nearly parallel with side of the machine, ready to again pass forward on the outside of the grain lying on the platform. The gearing that operates the rake will be connected to the driving-gear by a clutch, so that it can be thrown in and out of gear, and thus permit the rake to stand still while sufficient grain is being cut to form a bundle, especially in light grain. In heavy grain it may not be necessary to throw it out of gear at all.

It will be observed that the main object sought to be accomplished is to gather the grain up into a bundle with its butts as even as possible, and then compress it into a compact mass, holding the straw well together throughout its length, and deliver it in that condition in front of the binder seated on the machine, so as to enable him to bind it more readily and rapidly than can be done when he is compelled, as in most cases, to spend a portion of his time in gathering up and compacting the bundle before passing the band around it, or in separating the mass into bundles, as he must do when the grain is delivered by belts or endless carriers onto a binding-table or into a hopper or trough.

I am aware that numerous machines have been patented in which rakes are used, operating on the same general plan, and that binders' tables and seats have been connected to machines in various ways, and therefore I do not claim such broadly; but

Having thus described my invention, what I claim is—

1. The slot I and groove $o$, arranged in relation to each other, substantially as described, for the purpose of guiding and directing the movements of the rake D, as set forth.

2. The rake D, in combination with the rod $c$, said rod having one end hinged to the rake, with its opposite end hinged to the side of the machine, at or near its rear end, and provided with a series of intermediate joints, independent of the joint-rod $b$, and arranged to operate as described, to assist in guiding and controlling the rake in its movements, as set forth.

3. In combination with the rake D, having the pointed rod $c$ hinged to its rear end, the finger-piece R hinged to the rake at its front end, and attached rigidly to the joint-rod $b$, the said parts being constructed and arranged to operate substantially as described.

4. The box $o$, with its binding-board P arranged at the corner of the platform and at right angles to the rake during its backward movement, for the purpose of enabling the binder to receive the bundle from the rake in a compact form, as herein set forth.

STEPHEN D. CARPENTER.

Witnesses:
  W. C. DODGE,
  JOS. T. K. PLANT.